United States Patent
Johnson et al.

(10) Patent No.: US 9,665,848 B1
(45) Date of Patent: May 30, 2017

(54) INVENTORY MANAGEMENT SYSTEM AND METHOD OF USE

(71) Applicant: O-Ring Sales & Service, Inc., Lenexa, KS (US)

(72) Inventors: Andrew Allen Johnson, Overland Park, KS (US); Jonathan Peter Hansen, Overland Park, KS (US); Adam Lewis O'Hara, Lenexa, KS (US)

(73) Assignee: O-Ring Sales & Service, Inc., Lenexa, KS (US)

( * ) Notice: Subject to any disclaimer, the term of this patent is extended or adjusted under 35 U.S.C. 154(b) by 0 days.

(21) Appl. No.: 15/364,069

(22) Filed: Nov. 29, 2016

Related U.S. Application Data

(60) Provisional application No. 62/261,060, filed on Nov. 30, 2015.

(51) Int. Cl.
| | |
|---|---|
| *G06Q 20/20* | (2012.01) |
| *G06Q 10/08* | (2012.01) |
| *G06K 19/077* | (2006.01) |
| *G07G 1/00* | (2006.01) |
| *G06K 19/06* | (2006.01) |
| *G08B 13/24* | (2006.01) |
| *G06K 17/00* | (2006.01) |

(52) U.S. Cl.
CPC ..... *G06Q 10/087* (2013.01); *G06K 19/06028* (2013.01); *G06K 19/06037* (2013.01); *G06K 19/07758* (2013.01); *G06Q 10/08* (2013.01); *G06Q 20/203* (2013.01); *G07G 1/009* (2013.01); *G08B 13/2417* (2013.01); *G06K 2017/0051* (2013.01)

(58) Field of Classification Search
CPC .... G06Q 20/203; G06Q 10/08; G06Q 10/087; G06K 2017/0051; G06K 19/06028; G06K 19/06037; G06K 19/07758; G08B 13/2417; G07G 1/009
See application file for complete search history.

(56) References Cited

U.S. PATENT DOCUMENTS 2,971,806 A * 2/1961 Andreasen ........... G08B 3/1008
312/223.1
4,862,160 A 8/1989 Ekchian et al.
(Continued)

FOREIGN PATENT DOCUMENTS

| DE | 102008035633 B4 | 9/2013 |
| DE | 102011108705 B4 | 10/2014 |
| WO | 0167356 A1 | 9/2001 |

*Primary Examiner* — Daniel Walsh
(74) *Attorney, Agent, or Firm* — Hovey Williams LLP

(57) ABSTRACT

A system for monitoring inventory items, with each inventory item being associated with a radio frequency identification (RFID) tag. The system comprises a check-in station for checking in inventory items. The check-in station comprises a first reader antenna for receiving information from RFID tags of inventory items being checked in, and a first indicator for providing an indication of the inventory items being checked in. The system additionally comprises a check-out station for checking out inventory items. The check-out station comprises a second reader antenna for receiving information from RFID tags of inventory items being checked out, and a second indicator for providing an indication of the inventory items being checked out.

16 Claims, 5 Drawing Sheets

(56) References Cited

U.S. PATENT DOCUMENTS

| | | | | |
|---|---|---|---|---|
| 5,038,023 A * | 8/1991 | Saliga | B60R 25/24 | 235/383 |
| 5,655,824 A * | 8/1997 | DeCosse | A61B 50/10 | 312/209 |
| 5,689,238 A * | 11/1997 | Cannon, Jr. | G06K 17/00 | 340/10.31 |
| 5,729,697 A * | 3/1998 | Schkolnick | G06Q 20/203 | 235/383 |
| 5,801,628 A * | 9/1998 | Maloney | G06Q 10/087 | 235/375 |
| 5,805,074 A * | 9/1998 | Warren | G07C 9/0069 | 312/215 |
| 5,963,134 A * | 10/1999 | Bowers | G06K 17/00 | 235/375 |
| 6,127,938 A * | 10/2000 | Friedman | G08G 1/017 | 206/720 |
| 6,142,375 A * | 11/2000 | Belka | G06T 7/0008 | 235/454 |
| 6,169,483 B1 | 1/2001 | Ghaffari et al. | | |
| 6,189,789 B1 * | 2/2001 | Levine | G06Q 20/343 | 235/383 |
| 6,195,006 B1 * | 2/2001 | Bowers | G06K 17/00 | 340/10.1 |
| 6,561,418 B1 * | 5/2003 | Frich | A47F 9/046 | 235/381 |
| 6,655,545 B1 * | 12/2003 | Sonneborn | G06F 19/325 | 221/7 |
| 6,842,115 B1 * | 1/2005 | Harris | G06Q 20/20 | 235/381 |
| 6,964,370 B1 * | 11/2005 | Hagale | A47C 7/72 | 235/380 |
| 7,336,174 B1 * | 2/2008 | Maloney | G08B 13/1427 | 340/568.1 |
| 7,486,188 B2 | 2/2009 | Van Alstyne | | |
| 7,504,949 B1 | 3/2009 | Rouaix et al. | | |
| 7,518,516 B2 * | 4/2009 | Azevedo | G08B 13/1427 | 340/572.1 |
| 8,334,751 B2 * | 12/2012 | Azevedo | G06Q 10/087 | 235/375 |
| 8,384,545 B2 * | 2/2013 | Hussain | G06K 7/10178 | 312/209 |
| 8,770,479 B1 * | 7/2014 | Shoenfeld | G06Q 90/00 | 235/375 |
| 9,406,059 B1 * | 8/2016 | White | G06Q 20/208 | |
| 2001/0013830 A1 * | 8/2001 | Garber | G06K 7/10079 | 340/572.4 |
| 2001/0016800 A1 * | 8/2001 | Koh | G06K 17/0022 | 702/188 |
| 2001/0051905 A1 | 12/2001 | Lucas | | |
| 2002/0014964 A1 * | 2/2002 | Okamura | G06Q 10/08 | 340/572.1 |
| 2002/0052808 A1 * | 5/2002 | Sekihata | G06Q 10/087 | 705/28 |
| 2002/0093426 A1 * | 7/2002 | Jackson | G06K 7/0008 | 340/572.7 |
| 2003/0001740 A1 * | 1/2003 | Belka | G08B 13/2417 | 340/572.3 |
| 2003/0006633 A1 * | 1/2003 | Clothier | A47C 1/12 | 297/180.12 |
| 2003/0024982 A1 * | 2/2003 | Bellis, Jr. | A47F 9/047 | 235/383 |
| 2003/0029862 A1 * | 2/2003 | Clothier | A47C 1/12 | 219/621 |
| 2003/0125974 A1 * | 7/2003 | Frich | G06K 17/00 | 235/381 |
| 2004/0046020 A1 * | 3/2004 | Andreasson | A61J 1/14 | 235/385 |
| 2004/0142603 A1 * | 7/2004 | Walker | H01L 25/16 | 439/701 |
| 2004/0144842 A1 * | 7/2004 | Brignone | G06Q 10/087 | 235/385 |
| 2005/0040934 A1 * | 2/2005 | Shanton | A47F 5/11 | 340/5.92 |
| 2005/0090961 A1 * | 4/2005 | Bonk | B07C 5/3425 | 701/50 |
| 2005/0149414 A1 | 7/2005 | Schrodt et al. | | |
| 2005/0258961 A1 | 11/2005 | Kimball et al. | | |
| 2005/0283404 A1 | 12/2005 | Young | | |
| 2006/0102645 A1 | 5/2006 | Walker et al. | | |
| 2006/0125356 A1 * | 6/2006 | Meek, Jr. | A61G 12/001 | 312/215 |
| 2006/0139149 A1 * | 6/2006 | Faro | G07C 9/00103 | 340/5.73 |
| 2006/0145854 A1 * | 7/2006 | Garber | G06K 7/0008 | 340/572.1 |
| 2006/0214796 A1 * | 9/2006 | Ishikawa | G08B 13/2462 | 340/572.1 |
| 2006/0224459 A1 | 10/2006 | Aramaki et al. | | |
| 2006/0244593 A1 * | 11/2006 | Nycz | A61F 2/4425 | 340/572.1 |
| 2007/0095911 A1 * | 5/2007 | Shimura | G06K 7/0004 | 235/440 |
| 2007/0102513 A1 * | 5/2007 | Scheb | G07G 1/0018 | 235/383 |
| 2007/0126578 A1 * | 6/2007 | Broussard | G06K 17/0022 | 340/572.1 |
| 2008/0001760 A1 * | 1/2008 | Oh | G06K 7/10316 | 340/572.7 |
| 2008/0004908 A1 * | 1/2008 | Oh | G06F 19/327 | 705/2 |
| 2008/0094214 A1 * | 4/2008 | Azevedo | G08B 13/2457 | 340/568.1 |
| 2008/0111691 A1 * | 5/2008 | Lee | G06K 17/00 | 340/572.1 |
| 2008/0224826 A1 * | 9/2008 | Kuwako | G06K 7/0008 | 340/10.1 |
| 2008/0224875 A1 * | 9/2008 | Phillips | G06K 7/10316 | 340/572.8 |
| 2008/0283596 A1 * | 11/2008 | Ishida | B65G 1/137 | 235/385 |
| 2008/0296387 A1 * | 12/2008 | Sanders | G06K 7/10693 | 235/462.41 |
| 2008/0316045 A1 * | 12/2008 | Sriharto | G06Q 50/22 | 340/10.1 |
| 2009/0001166 A1 * | 1/2009 | Barkan | G06K 7/10801 | 235/462.14 |
| 2009/0021345 A1 * | 1/2009 | Sriharto | G08B 13/1427 | 340/5.6 |
| 2009/0134220 A1 * | 5/2009 | Sano | G06Q 10/06 | 235/383 |
| 2009/0251293 A1 * | 10/2009 | Azevedo | G06Q 10/087 | 340/10.1 |
| 2009/0307097 A1 * | 12/2009 | De Faria | A47F 9/047 | 705/17 |
| 2010/0106609 A1 * | 4/2010 | Sherman | G06Q 20/202 | 705/21 |
| 2010/0115634 A1 * | 5/2010 | Chung | G06F 21/86 | 726/35 |
| 2010/0123553 A1 * | 5/2010 | Banerjee | H01Q 1/2208 | 340/10.1 |
| 2010/0194538 A1 * | 8/2010 | dos Reis Medeiros | G06K 7/0008 | 340/10.1 |
| 2011/0115610 A1 * | 5/2011 | Hughes | B01L 9/00 | 340/10.1 |
| 2011/0253795 A1 * | 10/2011 | Kato | G06K 19/07749 | 235/492 |
| 2011/0266342 A1 * | 11/2011 | Forster | G06K 7/0008 | 235/385 |
| 2011/0309955 A1 * | 12/2011 | Ahmadi | G06F 13/4072 | 341/22 |
| 2012/0044054 A1 * | 2/2012 | Hussain | G06K 7/10178 | 340/10.1 |
| 2012/0090032 A1 * | 4/2012 | Trinklein | G06F 21/10 | 726/26 |
| 2012/0248188 A1 * | 10/2012 | Kearney | G06K 7/10722 | 235/440 |

(56) References Cited

U.S. PATENT DOCUMENTS

| | | | | |
|---|---|---|---|---|
| 2014/0145822 A1* | 5/2014 | Shoenfeld | ........... | G07C 9/00111 340/5.61 |
| 2014/0291397 A1* | 10/2014 | Caputo | ................ | G06Q 10/087 235/385 |
| 2014/0379518 A1* | 12/2014 | Driessen | ................ | G06Q 30/00 705/26.7 |
| 2015/0154434 A1* | 6/2015 | Rahim | ................ | G06K 7/10356 340/572.1 |
| 2016/0089303 A1* | 3/2016 | Latorraca | ................ | G07F 11/62 312/209 |
| 2016/0180124 A1* | 6/2016 | Roth | .................. | G06K 7/10316 235/451 |
| 2016/0342760 A1* | 11/2016 | Mastromonaco | ... | G06F 19/3412 |
| 2016/0350705 A1 | 12/2016 | Endries et al. | | |

\* cited by examiner

INVENTORY MANAGEMENT SYSTEM AND METHOD OF USE

CROSS-REFERENCE TO RELATED APPLICATION

This non-provisional patent application claims priority benefit, with regard to all common subject matter, of earlier-filed U.S. Provisional Patent Application No. 62/261,060, filed Nov. 30, 2015, and entitled "AUTOMATED VENDOR MANAGED INVENTORY SYSTEM." The above-identified earlier-filed provisional patent application is hereby incorporated by reference in its entirety into the present non-provisional application.

BACKGROUND OF THE INVENTION

1. Field of the Invention

Embodiments of the present invention relate generally to a system and method for managing inventory. More specifically, embodiments of the present invention are directed to a system incorporating radio frequency identification (RFID) components for managing inventory as the inventory is checked in, stored within, and/or checked out of a facility.

2. Description of the Related Art

Inventory management is common issue for any organization involved in the manufacture or distribution of goods. Inadequate inventory management can lead to inventory being out-of-stock, which can result in production deficiencies and lost sales. For example, an automotive manufacturer might use many thousands of small parts to manufacture a vehicle. If the automotive manufacturer runs out of even one of the required small parts, then it may be required to halt production of its vehicles until such required parts have been re-ordered and delivered by a vendor. One potential method previously used to reduce the occurrence of out-of-stock conditions is to create an overstocked condition, whereby a significant amount of inventory is maintained at the manufacturing facility, with such an amount being much more than is required for daily or weekly manufacturing needs. However, overstocked conditions can also be costly, as the manufacture must devote space and resources to storing and managing such extra inventory. Furthermore, even with inventory being overstocked, if the manufacturer does not accurately track its inventory, the manufacturer can easily run out of inventory and create an out-of-stock condition.

In addition to overstocking inventory, some computer-implemented systems have previously been developed that are capable of monitoring inventory. For example, such systems may include a database that tracks inventory as it is received and used by a manufacturer. However, most of such previously-used computer-implemented systems require information related to the inventory to be manually entered into the system by a user. For example, a user may be required to manually enter into a computing device (e.g., via a computer keyboard) when inventory has been received by the manufacture, such that the database can be updated to show that such inventory is in the possession of the manufacturer. Similarly, the user of such a system may be required to manually update the database as the inventory is used or is otherwise removed from the manufacturer's possession. Such manual entry requirements can lead to errors in the management of the manufacturer's inventory.

To help further automate such previously-used systems, certain systems have also incorporated the use of scanning technologies, which can scan and register inventory as the inventory is received and/or removed. For example, such scanning technologies may include bar-code systems, QR-code systems, or radio frequency identification (RFID) systems. RFID systems are perhaps the most efficient form of scanning technologies, as inventory can be tracked without a user being required to manually use a scanning tool (e.g., bar-code scanner) to physically scan each piece of inventory as it is received and/or removed. However, previously-used RFID systems have significant drawbacks. For example, accurate RFID systems are often expensive because RFID antennas and readers used in such systems are required to operate at high power levels (e.g., such RFID antennas are configured to emit and receive high-power electromagnetic signals). In addition, many previously-used RFID systems are configured to be permanently built into a facility and are restricted from being moved within the facility. For example, many previously-used RFID systems are formed as "portals," similar to airport metal detectors, which a user must walk through. As such, the RFID system is configured to read an RFID tag secured to inventory items carried by the user as the user walks through the portal. To facilitate efficiency, such portals are generally positioned near an entrance and/or an exit of a facility; however, such portals are not generally moveable from such locations. As such, previously-used RFID systems are often inflexible, as they do not permit reconfigurations or rearrangements of a facility's layout or workflow. Furthermore, users of such previously-used RFID systems generally do not know when an inventory item has been properly read into the system. As such, users receive no indication or verification that the system is working as it should be.

SUMMARY

Embodiments of the present invention include a system for monitoring inventory items, with each inventory item being associated with a radio frequency identification (RFID) tag. The system comprises a check-in station for checking in inventory items. The check-in station comprises a first reader antenna for receiving information from RFID tags of inventory items being checked in, and a first indicator for providing an indication of the inventory items being checked in. The system additionally comprises a check-out station for checking out inventory items. The check-out station comprises a second reader antenna for receiving information from RFID tags of inventory items being checked out, and a second indicator for providing an indication of the inventory items being checked out.

Embodiments of the present invention additionally include a method for managing inventory, with each inventory item being associated with a radio frequency identification (RFID) tag. The method includes a step of checking in a first inventory item at a check-in station. The check-in station comprises a first reader antenna for receiving information from an RFID tag associated with the first inventory item, and a first indicator for providing an indication of the first inventory item being checked in. The method includes an additional step of checking out a second inventory item at a check-out station. The check-out station comprises a second reader antenna for receiving information from an RFID tag associated with the second inventory item, and a second indicator for providing an indication of the second inventory item being checked out.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
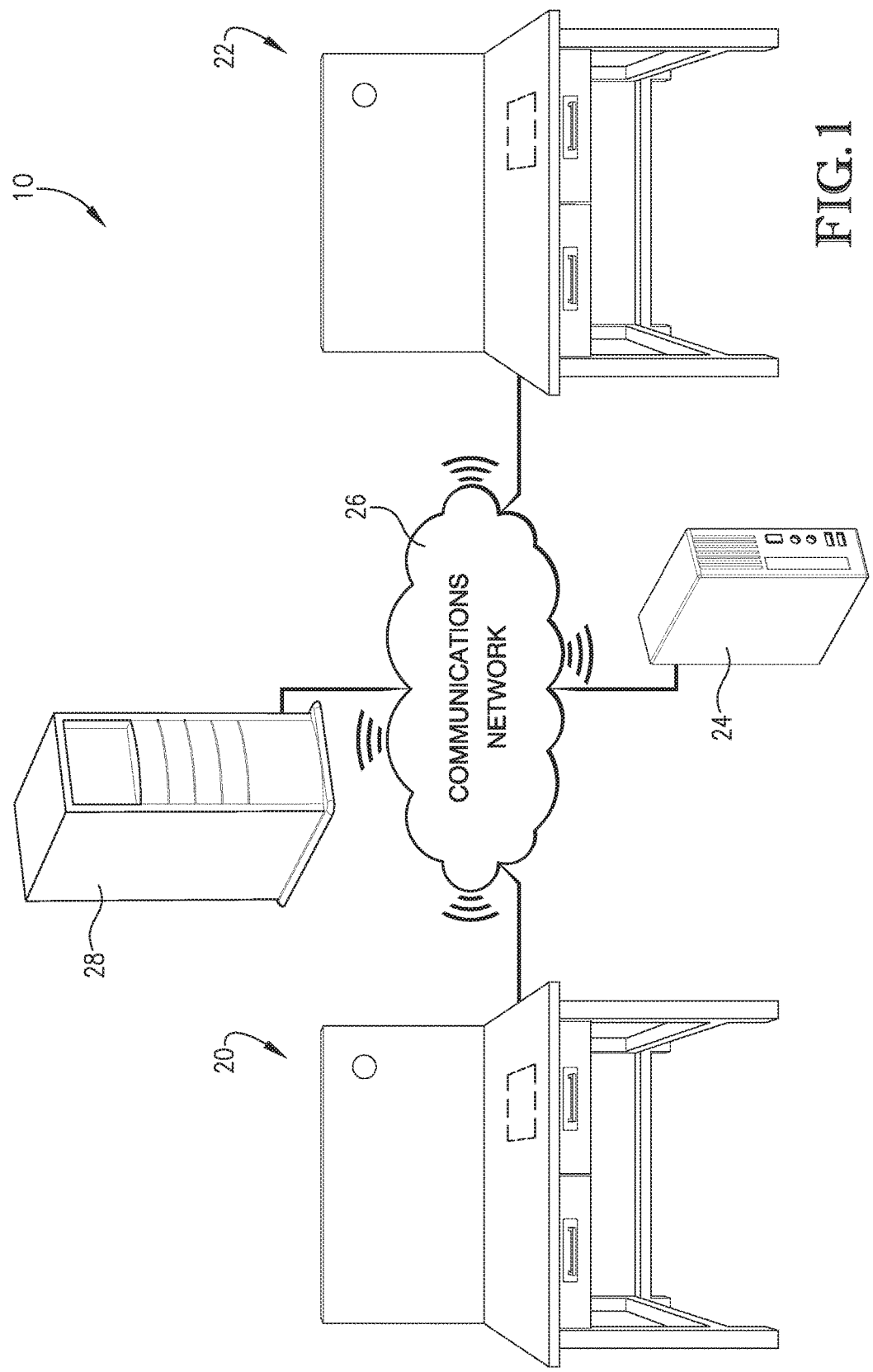
FIG. 1 is schematic depiction of an inventory management system according to embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Inventory Management System

Embodiments of the present invention include an inventory management system 10, as illustrated in FIG. 1. The inventory management system 10 can be implemented in various types of facilities operated by end users that use or distribute inventory items. For example, such facilities can include manufacturing facilities, storage facilities, distribution centers, or the like (hereinafter referred to as "end-user facilities" or "end-user facility"). With reference to FIG. 1, the inventory management system 10 may broadly comprise a check-in station 20 for adding inventory items into the inventory at an end-user facility, and a check-out station 22 for removing inventory items from the inventory of the end-user facility. The inventory management system 10 may also include one or more computing devices 24 for processing information related to the inventory items being checked in and checked out of the end-user facility and for providing an inventory database for storing information related to such inventory items. The check-in station 20, the check-out station 22, and the computing device 24 may all be interconnected via a communications network 26.

Furthermore, in certain embodiments, the inventory management system 10 may also comprise one or more server devices 28 located separately from the check-in station 20, the check-out station 22, and the computing device 24. Regardless of being spaced apart, the computing device 24 and the server device 28 may be in communications via the communications network 26. In more detail, while the check-in station 20, the check-out station 22, and the computing device 24 may each be located at an end-user facility, the server device 28 may be located at a vendor's location, with the vendor being an entity that supplies the inventory items to the end-user. For example, the vendor may be a small parts manufacturer that manufactures small parts and that delivers such small parts to the end user for use in the end user's manufacturing. In such embodiments, the vendor may at least partially control the inventory management system 10, such that the inventory management system 10 is considered a vendor-managed inventory (or VMI) system.

As will be described in more detail below, the inventory management system 10 may incorporate radio frequency identification (RFID) technology for monitoring inventory items being checked in and checked out of the end-user facility. Broadly, each of the inventory items added (i.e., checked in) or removed (i.e., checked out) from the inventory of the end-user facility may be associated with an RFID tag, which is comprised of an electromagnetic antenna and an integrated circuit for storing information associated with the inventory item to which the RFID tag is attached. In addition, the inventory management system 10 may comprise one or more RFID readers configured to emit an electromagnetic interrogation signal capable of being received by the RFID tag. In response to the interrogation signal, the RFID tags are configured to emit an electromagnetic response signal, which includes the information stored within the RFID tag. The RFID reader is configured to receive the response signal, and can, thereafter, provide the inventory information associated with the inventory item to the computing device 24 for storage and/or for analysis. As such, the inventory management system 10 of embodiments of the present invention can be used to manage inventory items as they are received and removed from the inventory of the end-user facility.

It should be understood that the inventory management system 10 may be used to manage various types of inventory items, including "consumable" inventory items or "fixed" inventory items. Consumable inventory items may comprise inventory items that are intended to be consumed by an end user, such as by being used in a manufacturing process to manufacture goods. As such, consumable inventory items may, in some embodiments, be small, inexpensive parts that are sub-components of manufactured goods or that are consumed by the end user during the end user's operations. Alternatively, fixed inventory items may comprise items that are permanent or that are reusable by an end user, such as tools and equipment used during the end user's manufacturing processes. As such, fixed inventory items may, in some embodiments, be high-value, re-usable items that are re-used throughout the end user's operations. Regardless of whether inventory is consumable or fixed, the inventory management system 10 may be implemented to manage such inventory.

Check-in Station and Check-Out Station

Figure 2:
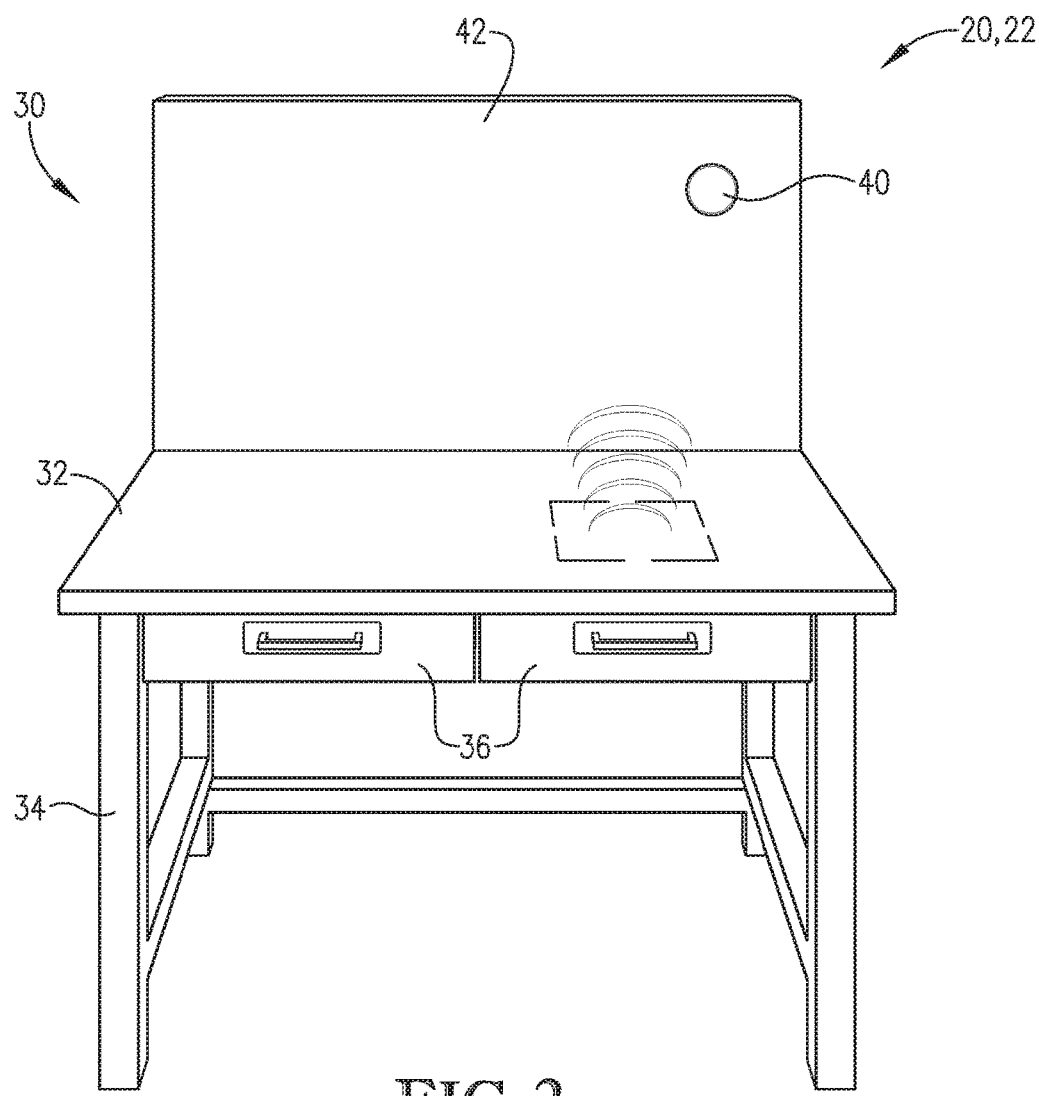
FIG. 2 is a perspective view of a check-in station or a check-out station from the inventory management system of FIG. 1.

Turning now to the inventory management system 10 in more detail, and with reference to FIG. 2, an example of the check-in station 20 and the check-out station 22 is illustrated. In some embodiments, the check-in station 20 and the check-out station 22 may be structurally similar. For example, the check-in station 20 and the check-out station 22 may each comprise a piece of equipment configured to support one or more additional components of the inventory management system 10. As shown in FIG. 2, the check-in station 20 and the check-out station 22 may each comprise a table 30 that includes a table top 32 and one or more supporting elements 34 for supporting the table top 32 above the ground. The table 30 may also include one or more drawers 36, which can support components of the inventory management system 10, as will be discussed in more detail below. Although the check-in station 20 and the check-out station 22 illustrated in FIG. 2 comprise tables, it should be understood that the check-in station 20 and/or the check-out station 22 may comprise other pieces of equipment, such as a counters, stands, pulpits, desks, benches, kiosks, and the like. Regardless of the type of equipment used for the check-in station 20 and the check-out station 22, certain embodiments provide for the equipment to be at least somewhat portable or mobile, such that the placement of the check-in station 20 and the check-out station 22 can be repositioned and/or reconfigured within an end-user facility as may be necessary for efficient operation.

Remaining with FIG. 2, the table top 32 of the table 30 may be formed as a generally planar section of material. In some embodiments, the table top 32 may be formed from a material that does not significantly interfere with (or block) electromagnetic signals. For example, the table top 32 may be formed from a wood-based material (e.g., wood, particle board, fiber board, laminated veneer lumber, or the like), plastics, composites, or the like. In some embodiments, as shown in FIG. 2, the table top 32 may be rectangular and may be sized so as to function as a working surface for users of the inventory management system 10. For example, the table top 32 may have a length of between twenty-four and seventy-two inches, between thirty-six and sixty inches, or about forty-eight inches, and may have a width of between twelve and thirty-six inches, between eighteen and thirty inches, or about twenty-four inches, and may have a thickness of between one-half and six inches, between one and three inches, or about one and one-half inches.

Embodiments of the present invention may provide for the supporting elements 34 of the table 30 to comprise one or more legs that extend from the ground up to and secured to the table top 32, such that the supporting elements 34 support the table top 32 above the ground. As shown in FIG. 2, the table 30 may include four legs positioned adjacent to corners of the table 30. However, other embodiments may provide for the supporting elements 34 to include more or less than four legs. For example, in some embodiments, the supporting elements 34 may comprise a single base-type element (e.g., pedestal or column) that extends from the floor and supports the table top 32 above the ground. The supporting elements 34 may extend from the ground a distance sufficient for a human user of the table 30 to access the table top 32 when standing at the table 30. For example, the supporting elements 34 may extend such that an upper surface of the table top 32 extends between thirty and sixty inches, between forty and fifty inches, or about forty-four inches above the ground. The supporting elements 34 may be formed from any material of sufficient strength and durability to support the table 30 and the remaining components of the inventory management system 10 supported therein/on, as will be described in more detail below. For example, the supporting elements 34 may be formed from stainless steel tubing.

In addition, as shown in FIG. 2, the table 30 may include one or more drawers 36, which are positioned immediately below the table top 32. As further illustrated in FIG. 3, the drawers 36 may each comprise a generally rectangular storage container configured to house components of the inventory management system 10. Specifically, the drawers 36 may each comprise a bottom, four sides, and an open top portion. In addition, each of the drawers 36 may be configured to translate horizontally (e.g., via ball bearing or roller-type slide mechanisms) from a closed position (See FIG. 2), in which the open top portion of the drawer 36 is positioned underneath the table top 32, to an open position (See FIG. 3), in which the open top portion of the drawer 36 is shifted forward, away from the table top 32. As should be apparent from the figures, with the drawers 36 in the closed position, an interior space of the drawers 36 is inaccessible. In contrast, with the drawers 36 in the open position, an interior space of the drawers is accessible via the open top portions. In some embodiments, the drawers 36 may be formed from materials that at least partially interfere with (or block) electromagnetic signals. For example, the bottom and four sides of the drawers 36 may be formed from stainless steel or another metal.

Returning to FIG. 2, each of the check-in station 20 and the check-out station 22 may also comprise an indicator 40 for providing an indication to a user of the inventory management system 10 as to when an inventory item has been properly checked in (i.e., via the check-in station 20) and/or checked out (i.e., via the check-out station 22). The indicator 40 may comprise any type of visual, audible, or kinetic indication device that is operable to provide an indication to a user. For example, as illustrated in FIG. 2, the indicator 40 may comprise visual indicators, in the form of light-emitting diodes (LEDs). However, the indicator 40 may comprise other types of visual indicators, such as florescent lights, display screens (e.g., LCDs screens, OLED screens, etc.), or the like. In addition, some embodiments may provide for indicators other than visual indicators to be used, such as speakers, horns, sirens, buzzers, vibrating mechanisms, or the like. However, it should be understood that, in some embodiments, visual indicators may be most preferred. Regardless of the type, the indicators 40 of the inventory management system 10 may be configured to provide an indication to a user. For example, the indicators 40 in the form of LEDs may operate in a digital, on-off manner (e.g., flashing). Alternatively, the LEDs may be configured to emit a plurality of different colors, with a change in color being indicative of an indication to a user.

As shown in FIG. 2, embodiments of the present invention may provide for the indicators 40 to be positioned above the table top 32 of the table 30, so as to ensure that the indicators 40 are easily viewable by users of the inventory management system 10. For example, the indicators 40 may be secured to a backboard 42 extending up from a back side of the table top 32. The backboard 42 may comprise plywood, pegboard, corkboard, or the like. Nevertheless, it should be understood that the indicators 40 may be positioned elsewhere with respect to the check-in station 20 or the check-out station 22. For example, the indicators 40 may be secured to a top surface of the table top 32. In even further embodiments, the indicators 40 may be set apart from the check-in station 20 or the check-out station 22, such that the indicators 40 are physically separated from the check-in station 20 and/or the check-out station 22.

The RFID components of the inventory management system 10 will now be described in more detail. In some embodiments, the check-in station 20 and the check-out station 22 may be configured to house, support, and facilitate operation of various RFID components included in the inventory management system 10, such that the inventory management system 10 can be used to manage inventory of an end-user facility by checking in and/or checking out inventory items to/from the end-user facility.

RFID Tags

Figure 4:
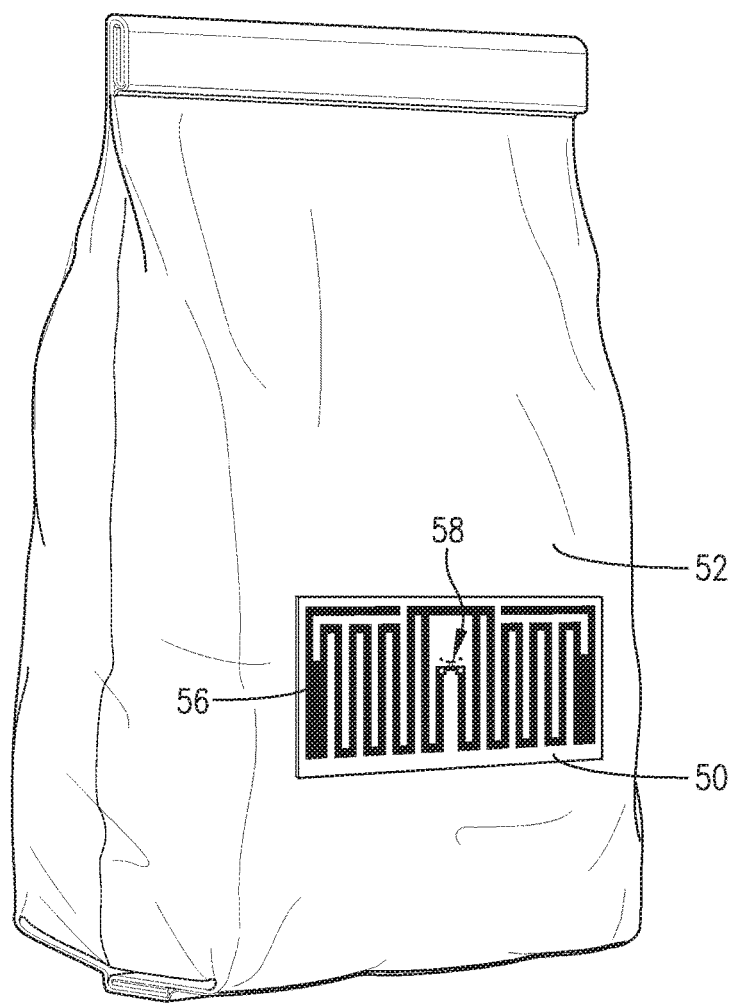
FIG. 4 is a perspective view of a bulk package inventory item with a radio frequency identification (RFID) tag attached thereto.

As mentioned above, inventory items that are checked in and/or checked out of an end-user facility using the inventory management system 10 will each be associated with an RFID tag 50, as is illustrated in FIG. 4. In some embodiments, the inventory items may comprise individual items or parts, which may or may not be individually packaged, but which will include an individual RFID tag. In other embodiments, inventory items may be grouped together in a bulk package 52 (See FIG. 4), such as a package of small parts, with such bulk package including a set number of individual items or parts. In such embodiments, the bulk package 52 may be associated with an individual RFID tag 50. As illustrated in FIG. 4, the RFID tag 50 may include a tag antenna 56 and an integrated circuit 58. The tag antenna 56 may be configured to receive an interrogation signal emitted by an RFID reader antenna (described in more detail below). The RFID tag 50 is configured to use a portion of the electrical power received from the interrogation signal to read data stored on the RFID tag's 50 integrated circuit 58 and, thereafter, to emit a response signal via the tag antenna 56. The response signal may include information associated with the data stored on the integrated circuit 58. As such, the RFID tag 50 can be interrogated by an interrogation signal and, in response to the interrogation signal, can provide feedback, in the form of a response signal. In such embodiments, the RFID tag 50 may be configured as a passive RFID tag. Nevertheless, certain embodiments may provide for the RFID tag used in the inventory management system 10 to comprise other types of RFID tags, such as active RFID tags or battery-assisted RFID tags.

In some embodiments, the integrated circuit 58 of the RFID tag 50 may only be configured to store a limited amount of data. As such, the RFID tag 50 may be formed in a generally small size and can be made operable after receiving an interrogation signal of relatively lower power. For example, in some embodiments, the integrated circuit 58 of the RFID tag 50 may only store data in the form of an inventory identification (ID) number. The inventory ID number may be numeric or alphanumeric and may be representative of the inventory item to which its associated RFID tag 50 is attached. In embodiments in which the inventory items are individual items, the inventory ID numbers may be item ID numbers. Contrastingly, in embodiments in which the inventory items are a plurality of items packaged in a bulk package (e.g., bulk package 52 of FIG. 4), the inventory ID numbers may be package ID numbers. Regardless, the inventory ID numbers can be represented by a relatively small amount of data. As such, the integrated circuit 58 (as well as the remaining portions) of the RFID tag 50 can be manufactured in a relatively small size. Because of the small size of the RFID tags 50, RFID printers may be used to print the RFID tags 50, in a manner similar to how an ink printer prints text on paper labels. As such, the inventory management system 10 may include an RFID printer for creating the RFID tags 50 described herein.

Inventory Database

To facilitate management of inventory items within an end-user facility, the inventory database provided by the computing device 24 of the inventory management system 10 may store the inventory ID numbers for each inventory item used in the end-user facility. In addition to inventory ID numbers, the inventory database may also store supplemental information about each of the inventory items used in the end-user facility. Such supplemental information may be in the form of inventory item specifications. For each inventory item that comprises an individual item or part, the inventory database may store the following inventory item specifications: a name of the item, a serial number of the item, a manufacturing date of the item, a current location of the item, a time stamp for when the item was checked in to or checked out from its current location, and/or the like. For each inventory item that comprises a bulk package with a plurality of individual items or parts, the inventory database may store the following inventory item specifications: number of individual items held within the bulk package, names of the individual items held within the bulk package, serial number of the individual items held within the bulk package, manufacturing dates of the individual items held within the bulk package, packaging dates for the individual items held within the bulk package, serial number of the bulk package, current location of the bulk package, a time stamp for when the bulk package was checked in to or checked out from its current location, and/or the like.

The combination of inventory ID number and inventory item specifications for each inventory item may be referred to herein as an inventory item data file. As should be appreciated, to ensure accurate management of all of the inventory items used in the end-user facility, the inventory database should store an inventory item data file for each inventory item that may, at any time, be checked into, in-stock within, and/or checked out from the end-user facility. To accomplish such, the inventory database may be formatted such that the inventory item data files are each stored within the inventory database in a tab delimited text format. In such a format, computer programs, such as SQL-based computer programs, can be run from computing devices, including computing device 24, for purposes of communicating with the inventory database to (1) update the inventory database, (2) query the inventory database, (3) perform analysis on the data within the inventory database, or (4) perform other management or analytical functions as may be necessary.

The inventory item data files may be entered into the inventory database by various entities. For example, if the end user of the end-user facility is operating the inventory management system 10 individually, then the end user may itself input into the inventory database the inventory item ID number and associated inventory item specifications (i.e., collectively the inventory item data file) for each inventory item that is, has been, or will be part of the end-user facility's inventory. Alternatively, in embodiments in which the end user is using the inventory management system 10 as part of a vendor-managed system, the vendor may input the inventory item ID number and associated inventory item specifications (i.e., collectively the inventory item data file) for each inventory item that is, has been, or will be part of the end-user's inventory. Such input may be performed, for instance, via the server device 28 communicating with the computing device 24 over the communications network 26.

RFID Components

Figure 3:
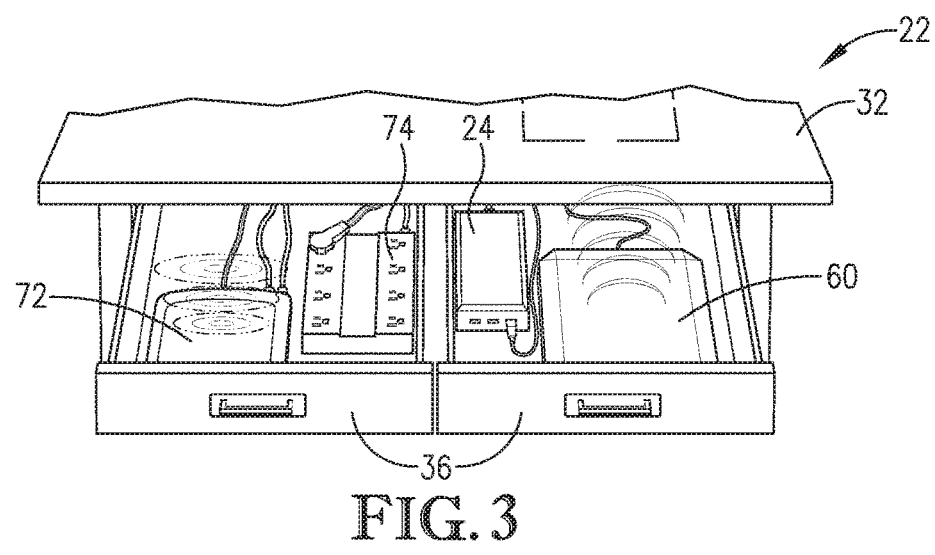
FIG. 3 is a partial perspective view of the station from FIG. 2, particularly illustrating drawers of the station in an open position.
Figure 5:
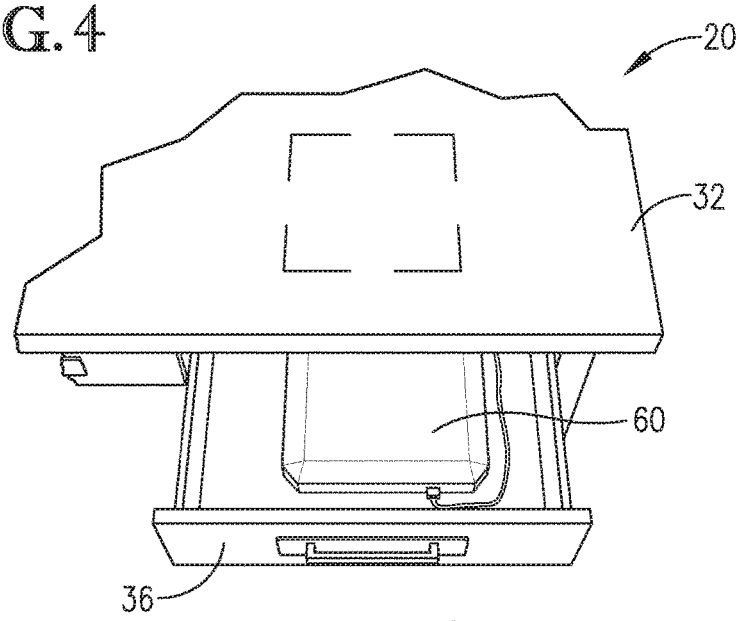
FIG. 5 is a partial perspective view of a drawer of the station from FIG. 2, particularly illustrating the drawer in an open position.

To generate and emit the interrogation signals used to scan the RFID tags 50, embodiments of the present invention provide for each of the check-in station 20 and the check-out station 22 to include an RFID reader antenna 60, as shown in FIGS. 3 and 5. The RFID reader antennas 60 are configured to generate the interrogation signals, which can be received by the RFID tags 50. Additionally, the RFID reader antennas 60 are configured to receive the response signals emitted by the RFID tags 50, with such response signals including information associated with the inventory items to which the RFID tags 50 are associated. For instance, the response signals may include the inventory ID numbers stored on the integrated circuits 58 of the RFID tags 50.

In some embodiments, as shown in FIGS. 3 and 5, the RFID reader antenna 60 of each of the check-in station 20 and the check-out station 22 may be stored in one of the drawers 36 of the tables 30. Beneficially, some embodiments provide for the drawers 36 to be formed from a material that at least partially interferes with (or blocks) electromagnetic signals. As such, with an RFID reader antenna 60 housed in a drawer 36, which is in a closed position (i.e., as illustrated in FIG. 2, with the open top portion of the drawer 36 positioned underneath and adjacent to the table top 32), the drawer 36 functions as a directional unit for the RFID reader antenna 60. Specifically, the bottom and four sides of the drawer 36, being formed from a material that at least partially interferes with (or blocks) electromagnetic signals, restrict the interrogation signal emitted by the RFID reader antenna 60 from passing through the bottom or the four sides. As such, the interrogation signal can only pass upwards through the open top portion of the drawer 36 and through the table top 32.

Figure 6:
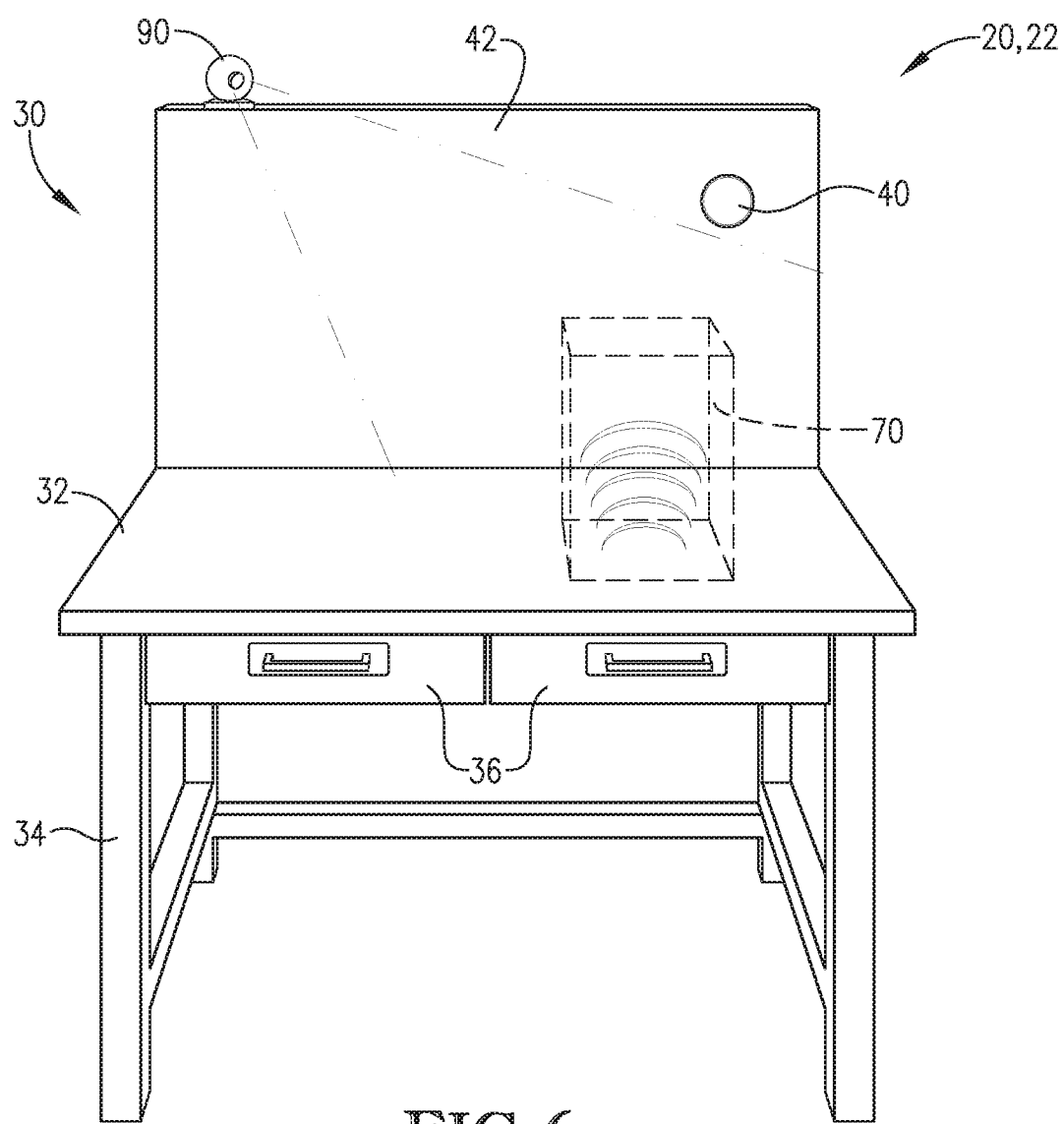
FIG. 6 is a perspective view of a check-in station or a check-out station from the inventory management system of FIG. 1, particularly illustrating a scanning zone for checking in or checking out inventory items.

As discussed above, the table top 32 may be formed from a material that does not interfere with electromagnetic signals. As such, the interrogation signal emitted by the RFID reader antenna 60 can exit through the open top portion of the drawer 36 and can pass through the table top 32. As illustrated by FIG. 6, the interrogation signal may be generated in the form of a scanning zone 70 directly above the drawer 36 that holds the RFID reader antenna 60. Such a scanning zone 70 may comprise a three-dimensional space through which the interrogation signal propagates at a sufficient power level so as to be receivable by a tag antenna 56 of an RFID tag 50 that passes through the scanning zone 70. The scanning zone 70 may extend upward above the top surface of the table top 32 by varying amounts depending on the power output of the RFID reader antenna 60. For example, the scanning zone 70 may extend at least forty-eight inches, at least thirty-six inches, at least twenty-four inches, at least twelve inches, or at least six inches above the table top 32. A width and length of the scanning zone 70 may be dependent on a width and length of the open top section of the drawer 36. Beneficially, because the structure of the drawers 36 allows for the interrogation signal to be directed in a particular direction (i.e., upward through the table top 32), the scanning zones 70 can be efficiently generated by the RFID reader antennas 60 at power levels much less than those required for other RFID-based tracking systems.

In addition to the RFID reader antennas 60, one or more of the check-in station 20 or the check-out station 22 may include an RFID reader 72. The RFID reader 72 may, as illustrated in FIG. 3, be stored in a second drawer 36 of the check-out station 22. The RFID reader 72 may be in electrical communication with each of the RFID reader antennas 60 via the communications network 26. As such, the RFID reader antennas 60 can forward any response signals emitted from scanned RFID tags 50 to the RFID reader 72. From the response signals, the RFID reader 72 is configured to obtain any pertinent information from such response signals. Specifically, as noted above, a response signal emitted by an RFID tag 50 may include information, in the form of an inventory ID number, associated with the inventory item to which the RFID tag 50 is attached. Thus, once an inventory item passes through a scanning zone 70 of either the check-in station 20 or check-out station, the applicable RFID reader antenna 60 can receive the response signal of RFID tag 50 and can transmit such response signal to the RFID reader 72. Thereafter, the RFID reader 72 can obtain the inventory ID number from the response signal, can generate a time stamp (e.g., minute, hour, date), and pass such information to the computing device 24 for updating and storage in the inventory database. To accomplish such, the RFID reader 72 may also be in communication with the computing device 24 via the communications network 26.

The communications network 26 may be generally any type wired or wireless network, and may include servers, routers, switches, wireless receivers and transmitters, and the like, as well as electrically conductive cables or optical cables. The communications network 26 may also include local, metro, or wide area networks, virtual private networks (VPNs), as well as the Internet, or other cloud networks. Furthermore, the communications network 26 may include cellular or mobile phone networks, as well as landline phone networks, Ethernet networks, fiber optic networks, or the like.

In certain specific embodiments, for example, the communications network 26 may include coaxial cables for connecting each of the RFID reader antennas 60 of the check-in station 20 and the check-out station 22 with the RFID reader 72. As such, the communications network 26 allows the response signals, including the information associated with the RFID tags 50 (e.g., inventory ID number), to be transmitted from the RFID reader antennas 60 to the RFID reader 72. In addition, the communications network 26 may include USB cables for connecting the RFID reader 72 with the computing device 24. As such, the communications network 26 allows information associated with the RFID tags 50 (e.g., inventory ID number and time stamp) to be transmitted from the RFID reader 72 to the computing device 24 and the inventory database. Furthermore, the communications network 26 may include hard-wired cables, such as Cat 5 cables, for connecting each of the indicators 40 of the check-in station 20 and the check-out station 22 with the RFID reader 72. As such, the RFID reader 72 can be used to control operation of the indicators 40, such as to provide an indication of an inventory item with an RFID tag 50 being scanned at the check-in station 20 or at the check-out station 22, as will be discussed in more detail below.

As illustrated in FIG. 3, the computing device 24 may similarly be housed in one of the drawers 36 of the check-in station 20 or the check-out station 22. The computing device 24 may comprise any device, component, or equipment with a processing element and associated memory elements. The processing element may implement operating systems, and may be capable of executing computer programs, which are also generally known as instructions, commands, software code, executables, applications ("apps"), and the like. The processing element may include processors, microprocessors, microcontrollers, field programmable gate arrays, and the like, or combinations thereof. The memory elements may be capable of storing or retaining computer programs and may also store data, typically binary data, including text, databases, graphics, audio, video, combinations thereof, and the like. The memory elements may also be known as a non-transitory "computer-readable storage medium" and may include random access memory (RAM), read only memory (ROM), flash drive memory, floppy disks, hard disk drives, optical storage media such as compact discs (CDs or CDROMs), digital video disc (DVD), Blu-Ray™, and the like, or combinations thereof. As such, the memory elements of the computing device 24 may provide access to the inventory database that stores information used in the inventory management system 10, such as the inventory item data files (e.g., inventory ID numbers and item specifications) for each inventory item in the end-user's inventory. The memory elements of the computing device 24 may also store other information and data necessary for the implementation of embodiments of the present invention. For example the computing device 24 may store one or more computer programs used to implement certain computer-implemented methods and processes described herein. These methods and processes may be carried out via the computer programs, or via hardware, firmware, or combinations thereof, all in conjunction with the components of the inventory management system 10 described herein.

In some embodiments, certain of the electrical components of the inventory management system 10 may be powered by the main power of the end-user facility. As such, one or more of the components of the inventory management system 10 may have power cords that can be individually coupled with main power outlets. In some embodiments, however, a power strip 74 (See FIG. 3) may be retained within one of the drawers 36 of either of the check-in station 20 or the check-out station 22. For example, in some specific embodiments, a power strip 74 may be retained in one of the drawers 36 of the check-out station 22. The power strip 74 may be connected to the end-user facility's main power and may provide a plurality of power outlets for providing power to the RFID reader 72, the computing device 24, and other components as may be required. In some embodiments, the RFID reader 72 may provide the necessary power to the RFID reader antennas 60 through the associated coaxial cables. Similarly, the RFID reader 72 may provide the necessary power to the indicators 40 through the Cat 5 cables. Furthermore, in some embodiments, the power strip 74 may be associated with a battery power source so as to be operable to provide continuous power to the components of the inventory management system 10 even upon a temporary loss of the end-user facility's main power.

Finally, as noted above, certain embodiments of the present invention may be implemented as a vendor-managed system. Some of such embodiments may incorporate the use of the server device 28, which may be positioned separately from the end-user facility, such as at a facility of a vendor. In such embodiments, the server device 28 will be in communication with the computing device 24 via the communications network 26, such as over an Internet connection and/or a VPN. As with the computing device 24, the server device 28 may comprise any device, component, or equipment with a processing element and associated memory elements. As such, the server device 28 can provide a vendor with access to the computing device 24 and the inventory database used in the inventory management system 10 of an end-user's facility.

Operation

In operation, the check-in station 20 and the check-out station 22 may be positioned within an end-user facility so as to efficiently facilitate tracking of inventory items as the inventory items transition through the end-user facility. For instance, in some embodiments, the check-in station 20 may be positioned near a receiving area of the end-user facility, such that as inventory items are received (e.g., offloaded from shipping trucks), the inventory items can be efficiently checked in through the check-in station 20. In contrast, the check-out station 22 may be positioned near a manufacturing or a shipping area of the end-user facility such that as inventory items are used in manufacturing or are shipped or dispatched from the end-user facility, the inventory items can be efficiently checked out through the check-out station 20. Beneficially, because the check-in station 20 and the check-out station 22 are portable and not permanently installed at a location within the end-user facility, the components of the inventory management system 10 have the flexibility to be efficiently repositioned and/or reconfigured throughout the end-user facility as may be necessary.

Turning now to the operation of the inventory management system 10 in more detail, as inventory items arrive at the end-user facility, each of the inventory items are checked in to the end-user facility via the check-in station 20. It is understood that, in some embodiments, the inventory items may arrive at the end-user facility with RFID tags 50 already affixed thereto. For example, RFID tags 50 may be applied to the inventory items by the vendor, i.e., as part of a vendor-managed system. In more detail, the vendor may use an RFID printer to print RFID tags and affix one to each of the inventory items before shipping the inventory items to the end-user facility. In such embodiments, the vendor may update the inventory database of the computing device 24 so as to include the inventory item data files associated with the inventory items being shipped to the end-user facility. Specifically, the vendor may update the inventory database to include the inventory ID numbers associated with each of the RFID tags 50, as well as the item specifications associated with each inventory ID number and corresponding inventory item. Thus, once the inventory items are received and checked in to the end-user facility, via the check-in station 20, the inventory ID numbers obtained from each inventory item's RFID tag 50 can be correlated with the appropriate inventory item data file maintained in the inventory database. As an alternative, the end-users at the end-user facility may themselves print off the RFID tags 50 and affix them to the inventory items once the inventory items arrive at the end-user facility. In such embodiments, the end users may also be required to manually input the inventory item data files for each inventory item into the inventory database.

Regardless, once the inventory items arrive at the end-user facility, the inventory items can be checked in by passing the inventory items through the scanning zone 70 of the check-in station 20. The RFID reader antenna 60 of the check-in station 20 may be continuously powered on such that it continuously emits the interrogation signal used to generate the scanning zone 70. As such, once an inventory item with an attached RFID tag 50 is passed through the scanning zone 70, the RFID tag 50 receives the interrogation signal and, in response, emits a response signal that includes information associated with the RFID tag 50. Specifically, the response signal includes information indicative of the inventory ID number stored in the integrated circuit 58 of the inventory item's RFID tag 50. The response signal is received by the RFID reader antenna 60 and passed to the RFID reader 72 over the communications network 26. The RFID reader 72 extracts the inventory ID number from the response signal and converts the inventory ID number into a readable text format. The RFID reader 72 sends the inventory ID number, along with a generated timestamp indicative of when the response signal was received, to the computing device 24 for updating the inventory database. In particular, the computing device 24 converts the readable text format of the inventory ID number and the timestamp into an electronic spreadsheet format and then into a tab delimited text format appropriate for updating the inventory item's inventory item data file stored in the inventory database. As such, the inventory database can be updated to indicate which inventory items have been received and checked in to the end-user facility, and, thus, which inventory items have been added to the inventory (i.e., in stock) within the end-user facility. The timestamp also provides an indication as to precisely when the inventory items were checked in to the end-user facility.

Furthermore, upon an inventory item with an RFID tag 50 passing through the scanning zone 70 of the check-in station 20 and a corresponding response signal being sent to the RFID reader 72, the RFID reader 72 may send an instruction to the indicator 40 of the check-in station 20, instructing the indicator 40 to provide an indication to the end-user that the inventory item has been properly checked in. Such an indication may be in the form of the indicator 40 providing a visual indication by switching from on-to-off, switching from off-to-on, switching from off-to-on-to-off (i.e., a brief flash), changing colors, or the like. Regardless of the type of indication, the system (preferably via visual indicator), thus, provides an immediate, real-time indication to the end-user that the inventory items have been properly checked into the end-user facility.

Upon being checked in to the end-user facility, the inventory item can be stored in the end-user facility's inventory (e.g., stocked on a shelf) until the inventory item is to be used or removed from the end-user facility's inventory. For example, if the end-user facility is a manufacturing facility, the inventory item may be used to manufacture goods. Alternatively, if the end-user facility is a distribution facility, the inventory item may be delivered from the end-user facility upon the end-user facility receiving an order to ship the inventory item. However, to ensure that the inventory items within the end-user facility are being properly managed by the inventory management system 10, the inventory items must first be checked out via the check-out station 22 before they can be used or removed.

In more detail, inventory items can be checked out by passing the inventory items through the scanning zone 70 of the check-out station 22. The RFID reader antenna 60 of the check-out station 22 may be continuously powered on such that it continuously emits an interrogation signal so as to generate the scanning zone 70. As such, once an inventory item with an associated RFID tag 50 is passed through the scanning zone 70, the RFID tag 50 receives the interrogation signal and, in response, emits a response signal that includes information associated with the RFID tag 50. Specifically, the response signal includes information indicative of the inventory ID number stored in the integrated circuit 58 of the inventory item's RFID tag 50. The response signal is received by the RFID reader antenna 60 of the check-out station 22 and is passed to the RFID reader 72 over the communications network 26. The RFID reader 72 extracts the inventory ID number from the response signal and converts the inventory ID number into a readable text format. The RFID reader 72 sends the inventory ID number, along with a timestamp of when the response signal was received, to the computing device 24 for storage in the inventory database. In particular, the computing device converts the readable text format of the inventory ID number and the timestamp into an electronic spreadsheet format and then into a tab delimited text format appropriate for updating the inventory item's inventory item data file stored within the inventory database. As such, the inventory database can be updated to indicate which inventory items have been checked out of the end-user facility, and, thus, which inventory items have been removed from the inventory (i.e., removed from stock) within the end-user facility. The timestamp also provides an indication as to precisely when the inventory items were checked out of the end-user facility.

Furthermore, upon an inventory item with an RFID tag 50 passing through the scanning zone 70 of the check-out station 22 and a corresponding response signal being sent to the RFID reader 72, the RFID reader 72 may send an instruction to the indicator 40 of the check-out station 22, instructing the indicator 40 to provide an indication to the end-user that the inventory item has been properly checked out. Such an indication may be in the form of the indicator 40 providing a visual indication by switching from on-to-off, switching from off-to-on, switching from off-to-on-to-off (i.e., a brief flash), changing colors, or the like. Regardless of the type of indication, the system (preferably via visual indicator), thus, provides an immediate, real-time indication to the end-user that the inventory items have been checked out from the end-user facility.

In view of the above, the inventory management system 10 can be used to track all inventory passing through an end-user facility. Specifically, the inventory management system 10 can track, in real time, when each inventory item has been received and checked in to the end-user facility via the check in station 20. Beneficially, the visual indicator 40 of the check-in station 20 provides an immediate verification to a user that an inventory item has been properly checked in. As such, errors with checking in inventory items into the end-user facility can be minimized. Once inventory items have been checked in to the end-user facility, their statuses are recorded within the inventory database as being "in stock." The inventory items will remain in stock within the inventory database until the inventory items are checked out of the end-user facility. As noted above, inventory items should be checked out of the end-user facility before the inventory items are used (e.g., as part of manufacturing) or are delivered/shipped from the end-user facility. The inventory management system 10 is configured to track, in real time, when each inventory item has been checked out from the end-user facility via the check-out station 22. Beneficially, the visual indicator 40 of the check-out station 22 provides an immediate verification to the user that an inventory item has been properly checked out. As such, errors with checking out inventory items from the end-user facility can be minimized.

In addition to tracking inventory as the inventory items are checked in, in stock, and checked out of the end-user facility, the inventory management system 10 can also be used to analyze data related to the inventory. In general, all information provided to the inventory database can be permanently stored within the inventory database for use in analyzing inventory. For example, if a user is interested in knowing how many of a particular type of inventory item is currently in stock, the user can access the inventory database and perform a query to determine precisely how many of such particular type or inventory items are currently in stock. In addition, if a user is interested in knowing how many of a particular inventory item are used by the end-user facility (e.g., used in manufacturing or delivered from the facility) over a given time period, the user can query the inventory database to determine exactly how many particular inventory items were used by the end-user facility over the given time period. Similarly, if a user is interested in knowing how long a particular inventory item normally remains in stock within the end-user facility over a given time period, the user can access the inventory database to determine exactly how long the particular inventory item normally remains in stock within the end-user facility over the given time period. Beneficially, because the inventory database stores the inventory item data files for each inventory item in a tab delimited text format, such analysis can be efficiently performed using SQL-based computer programs. Such computer programs can be fully customized as may be required to perform generally any type of analysis on the data included in the inventory database. Beneficially, the inventory management system 10 may, in some embodiments, be configured to propagate the information included in the inventory database, and analysis related thereto, to additional computing devices, i.e. accessible through a web interface, periodic email reports, desktop application or mobile apps, for additional analysis. Broadly, such analysis may include analyzing inventory levels within the end-user facility, inventory usage within the end-user facility, past and future inventory item purchase order reports, and the like.

The inventory management system 10 may also be used to automate certain aspects of the end-user facility's inventory management. For example, one embodiment of the present invention may include an automated re-order process for re-ordering inventory items in instances where the number of in-stock inventory items of a particular type fall below a predefined minimum threshold. In particular, a user of the inventory management system 10 may provide (e.g., via the computing device 24) a minimum threshold number for each type of inventory items used at the end-user facility. As described above, the number of all inventory items in stock within the end-user facility can be tracked, via the inventory management system 10, by tracking the inventory items as they are checked in and checked out of the end-user facility. As such, each time an inventory item of a particular type is checked in to the end-user facility, the total number of inventory items of the particular type that are in-stock within the end-user facility increases by one. Similarly, each time an inventory item of a particular type is checked out of the end-user facility, the total number of inventory items of the particular type that are in-stock within the end-user facility decreases by one. Upon the total number of in-stock inventory items of a particular type falling below a predefined minimum threshold (with such threshold selected by a user of the inventory management system 10), a purchase order can be automatically generated and sent to the vendor so as to re-order additional inventory items of the particular type. In some embodiments, the purchase order may be automatically generated by the computing device 24 and sent to the server device 28 of the vendor via the communications network 26. Alternatively, the server device 28 of the vendor may be in periodic or constant communication with the inventory database provided by the computing device 24, such that if the server device 28 determines that the total number of in-stock inventory items of a particular type have fallen below a pre-defined minimum threshold, the server device 28 can itself generate a purchase order so as to re-order additional inventory items for the end-user facility.

Before shipping the inventory items to the end-user facility, the vendor may print and affix an RFID tag 50 to the inventory items, such that the inventory items are ready to be tracked (e.g., checked in, stored, and checked out) by the inventory management system 10 at the end-user facility once the inventory items arrive at the facility. Furthermore, as discussed above, the vendor may update the inventory database, via communication between the server device 28 and the computing device 24, with appropriate inventory item data files, such that the inventory ID numbers stored on the RFID tags 50 are properly correlated with the item specifications of the inventory item data files stored within the inventory database. As such, once the inventory items are checked in at the facility, the inventory ID numbers obtained from the RFID tags 50 can be properly associated with inventory item data files in the inventory database.

Figure 7:
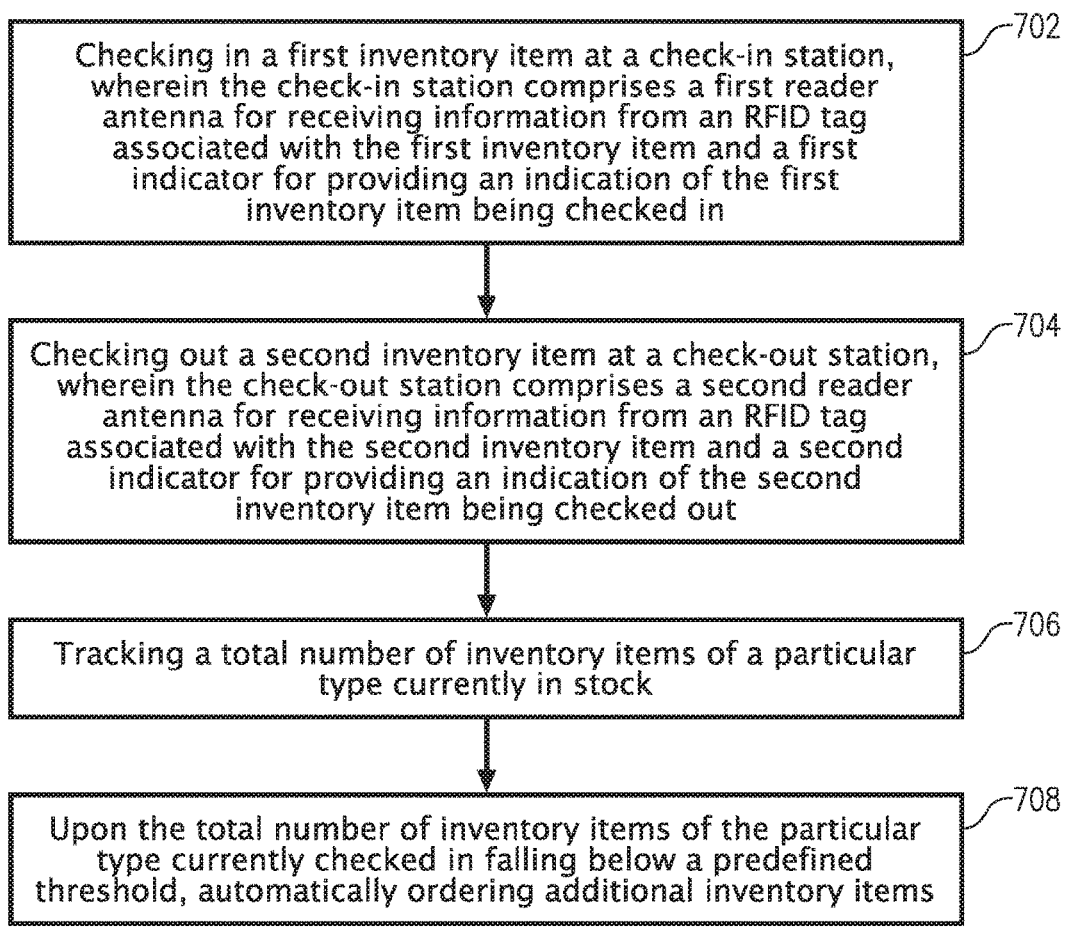
FIG. 7 is a flow chart of a method for managing inventory items according to embodiments of the present invention.

In view of the above, embodiments of the present invention include a method for managing inventory. Such a method is illustrated by FIG. 7, and may include an initial Step 702 of checking in an inventory item at a check-in station, with the check-in station comprising a first reader antenna for receiving information from an RFID tag associated with the inventory item and a first indicator for providing an indication of the inventory item being checked in. The method may additionally include a Step 704 of checking out an inventory item at a check-out station, with the check-out station comprising a second reader antenna for receiving information from the RFID tag associated with the inventory item and a second indicator for providing an indication of the inventory item being checked out. In some additional embodiments, the method may include a further Step 706 of tracking a total number of inventory items of a particular type currently in stock. Upon the total number of inventory items of the particular type currently checked in falling below a predefined threshold, the method may include a further Step 708 of automatically reordering additional inventory items.

Additional Features

Finally, some additional embodiments of the present invention may provide for the inventory management system 10 to be configured to capture physical representative data during inventory item check-ins and check-outs, with such data being in the form of pictures, video, 3D environment scans and 3D laser mapping of the end-user facility. For example, in the case of pictures, video, scans or mapping of the environment, positional data for each inventory item in stock within the end-user facility can be obtained and stored in the inventory database and analyzed, as needed, for future use.

In additional embodiments, the inventory management system 10 may include a user identification system for identifying and tracking users that check in and/or check out inventory items. For example, as illustrated in FIG. 6, the user identification system may comprise a camera 90 associated with the check-in station 20 and/or the check-out station 22. In some embodiments, the camera 90 may be in communication with the RFID reader 72 and/or with the computing device 24, such as via the communications network 26. In particular, the camera 90 may be configured to obtain an image or a video of the area around the scanning zone 70 as an inventory item is checked in and/or checked out. For example, upon an inventory item being passed through the scanning zone 70 of the check-in station 20 or the check-out station 22 by a user, the RFID reader 72 may send an instruction to the camera 90, instructing the camera 90 to obtain an image or video of the user. In some embodiments, the video or image of the user may be stored in the inventory database as part of the inventory item data file associated with the inventory item that was checked in or checked out. As such, the inventory management system 10 can be configured to provide a visual record of inventory items being checked in or checked out, as well as the users that perform the checking in or checking out. Such a configuration may be helpful to troubleshoot issues, such as problems relating to loss-prevention and improper record-keeping.

In addition to the camera 90, some embodiments of the inventory management system 10 may include a user identification system in the form of a scannable user identification (ID). In such embodiments, each user of the inventory management system 10 may be provided with a user ID. Each of such user IDs may include its own unique RFID tag that corresponds with the user to which the user ID is assigned. Upon a user checking in or checking out an inventory item (e.g., passing the inventory item through the scanning zone 70 of the check-in station 20 or the check-out station 22) the user may also pass their user ID through the scanning zone 70 such that a record of the user that performs the checking in or checking out can also be tracked.

Finally, in addition to collecting images or video when inventory items are checked in or checked out, some embodiments of the inventory management system 10 may include one or more cameras that obtain images or videos at all times and/or whenever a user passes by the check-in station 20 or the check-out station 22. In such embodiments, the cameras may be associated with the check-in station 20 or the check-out station 22 or, alternatively, may be set apart from the check-in station 20 or the check-out station 22. Regardless, the cameras may be configured to capture images or videos of the area around the check-in station 20 or the check-out station 22. As noted above, the cameras may be configured to constantly record images or videos. Alternatively, the cameras may be associated with a motion sensor, such that the cameras are configured to record images or videos only when a user passes by the check-in station 20 or the check-out station 22. In such embodiments, the images or videos obtained by the cameras may be stored in the inventory database sequentially or along with a timestamp for verifying the time when the user passed by the check-in station 20 or the check-out station 22. As such, embodiments of the present invention provide for the tracking of users or employees when such users or employees pass by the check-in station 20 or the check-out station 22 without checking in or checking out inventory items (i.e., scanning the inventory items through the scanning zone 70). Such a feature may be helpful, for instance, to identify users that are not using the inventory management system 10 properly, which can result in loss-prevention issues and improper recordkeeping.

Although the invention has been described with reference to the embodiment illustrated in the attached drawing figures, it is noted that equivalents may be employed and substitutions made herein without departing from the scope of the invention as recited in the claims.

The invention claimed is:

1. A system for monitoring inventory items and for updating information related to the inventory items in an inventory database, with each inventory item being associated with a radio frequency identification (RFID) tag, said system comprising:
 a check-in station configured to check in inventory items, wherein said check-in station comprises—
  a first reader antenna configured to receive information from RFID tags of inventory items being checked in,
  a first indicator configured to provide an indication of the inventory items being checked in,
  wherein said check-in station comprises a first top section and a first container, with said first top section presenting a first working surface,
  wherein said first container is shiftably attached to said first top section for shifting movement between a closed position in which said first container is directly below said first top section such that said check-in station is operable to check in inventory items on said first top section and an open position in which said first container is at least in part spaced from directly below said first top section such that an interior of said first container is accessible,
  wherein said first top section is comprised of a material that does not interfere with electromagnetic signals, and wherein said first container is comprised of a material that blocks electromagnetic signals,
  wherein said first reader antenna is positioned within said first container, and wherein said first container includes an open top portion positioned adjacent to a bottom surface of said first top section when said first container is in the closed position, such that said check-in station is configured to permit electromagnetic signals generated by said first reader antenna to exit from said first container upward through said first top section to generate a first scanning zone located above said first working surface when said first container is in the closed position, such that upon inventory items passing through said first scanning zone information from the RFID tags of the inventory items being checked in is obtained and provided to the inventory database; and
 a check-out station configured to check out inventory items, wherein said check-out station comprises—
  a second reader antenna configured to receive information from RFID tags of inventory items being checked out,
  a second indicator configured to provide an indication of the inventory items being checked out,
  wherein said check-out station comprises a second top section and a second container, with said second top section presenting a second working surface,
  wherein said second container is shiftably attached to said second top section for shifting movement between a closed position in which said second container is directly below said second top section such that said check-out station is operable to check out items on said second top section and an open position in which said second container is at least in part spaced from directly below said second top section such that an interior of said second container is accessible,
  wherein said second top section is comprised of a material that does not interfere with electromagnetic signals, and wherein said second container is comprised of a material that blocks electromagnetic signals,
  wherein said second reader antenna is positioned within said second container, and wherein said second container includes an open top portion positioned adjacent to a bottom surface of said second top section when said second container is in the closed position, such that said check-out station is configured to permit electromagnetic signals generated by said second reader antenna to exit from said second container upward through said second top section to generate a second scanning zone located above said second working surface when said second container is in the closed position, such that upon inventory items passing through said second scanning zone information from the RFID tags of the inventory items being checked out is obtained and provided to the inventory database.

2. The system of claim 1, wherein each of said check-in station and said check-out station comprises a table, wherein said first top section and said second top section each comprises a table top, and wherein each table further comprises one or more supporting elements for supporting the table top above the ground.

3. The system of claim 2, wherein said table tops are formed from a wood-based material.

4. The system of claim 1, wherein said first container and said second container each comprises a drawer.

5. The system of claim 4, wherein said drawers are formed from metal.

6. The system of claim 1, wherein said first indicator of said check-in station is configured to provide the indication of the inventory items being checked in when said inventory items are passed through said first scanning zone of said check-in station.

7. The system of claim 1, wherein said first indicator of said check-in station and said second indicator of said check-out station comprise light-emitting diodes.

8. The system of claim 1, wherein the inventory items comprise bulk packages each containing a plurality of individual parts, wherein the RFID tag of each inventory item is affixed to the inventory item's bulk package, and wherein each RFID tag is configured to store an inventory identification (ID) number, with each inventory ID number being associated with a particular inventory item.

9. The system of claim 8, further comprising a computing device providing the inventory database, wherein for each inventory ID number, the inventory database stores information related to the particular inventory item to which the inventory ID number is associated, with such information comprising one or more of the following: type of individual parts within a bulk package of the inventory item, serial number of the individual parts within the bulk package, number of individual parts within the bulk package, and manufacturing date of the individual parts within the bulk package.

10. A method for managing inventory items and for updating information related to the inventory items in an inventory database, with each inventory item being associated with a radio frequency identification (RFID) tag, said method comprising the steps of:
(a) checking in a first inventory item at a check-in station, wherein the check-in station comprises a first reader antenna for receiving information from an RFID tag associated with the first inventory item and a first indicator for providing an indication of the first inventory item being checked in,
wherein said check-in station further comprises a first top section and a first container, with said first top section presenting a first working surface,
wherein said first container is shiftably attached to said first top section for shifting movement between a closed position in which said first container is directly below said first top section such that said check-in station is operable to check in inventory items on said first top section and an open position in which said first container is at least in part spaced from directly below said first top section such that an interior of said first container is accessible,
wherein said first top section is comprised of a material that does not interfere with electromagnetic signals, and wherein said first container is comprised of a material that blocks electromagnetic signals,
wherein said first reader antenna is positioned within said first container, and wherein said first container includes an open top portion positioned adjacent to a bottom surface of said first top section when said first container is in the closed position, such that said check-in station is configured to permit electromagnetic signals generated by said first reader antenna to exit from said first container upward through said first top section to generate a first scanning zone located above said first working surface when said first container is in the closed position,
wherein said checking in of step (a) includes (i) passing the first inventory item through said first scanning zone to obtain information from the RFID tag of the first inventory item, and (ii) providing such information to the inventory database; and
(b) checking out a second inventory item at a checkout-station, wherein the check-out station comprises a second reader antenna for receiving information from an RFID tag associated with the second inventory item and a second indicator for providing an indication of the second inventory item being checked out,
wherein said check-out station further comprises a second top section and a second container, with said second top section presenting a second working surface,
wherein said second container is shiftably attached to said second top section for shifting movement between a closed position in which said second container is directly below said second top section such that said check-out station is operable to check out items on said second top section and an open position in which said second container is at least in part spaced from directly below said second top section such that an interior of said second container is accessible,
wherein said second top section is comprised of a material that does not interfere with electromagnetic signals, and wherein said second container is comprised of a material that blocks electromagnetic signals,
wherein said second reader antenna is positioned within said second container, and wherein said second container includes an open top portion positioned adjacent to a bottom surface of said second top section when said second container is in the closed position, such that said check-out station is configured to permit electromagnetic signals generated by said second reader antenna to exit from said second container upward through said second top section to generate a second scanning zone located above said second working surface when said second container is in the closed position,
wherein said checking out of step (b) includes (i) passing the second inventory item through said second scanning zone to obtain information from the RFID tag of the second inventory item, and (ii) providing such information to the inventory database.

11. The method of claim 10, further comprising the steps of:
(c) tracking a total number of inventory items of a particular type currently checked in; and
(d) upon the total number of inventory items of the particular type currently checked in falling below a predefined threshold, automatically ordering additional inventory items.

12. The method of claim 10, wherein during said checking in of step (a) the first reader antenna receives the information from the RFID tag of the first inventory item, with such information comprising an inventory identification (ID) number from the RFID tag of the first inventory item, wherein upon receiving the inventory ID number from the RFID tag of the first inventory item, the first indicator provides a visual indication of the first inventory item being checked in.

13. The method of claim 10, wherein during said checking out of step (b) the second reader antenna receives the information from the RFID tag of the second inventory item, with such information comprising an inventory identification (ID) number from the RFID tag of the second inventory item, wherein upon receiving the inventory ID number from the RFID tag of the second inventory item, the second indicator provides a visual indication of the second inventory item being checked out.

14. A system for monitoring inventory items within a facility, with each inventory item being associated with a radio frequency identification (RFID) tag, said system comprising:
a computing device configured to provide an inventory database for storing information related to the inventory items,
a check-in station configured to check in inventory items into the facility, wherein said check-in station comprises—
a first reader antenna configured to read information from RFID tags of inventory items being checked in,
a first indicator configured to provide an indication of the inventory items being checked in,
wherein said check-in station comprises a first top section and a first container, with said first top section presenting a first working surface,
wherein said first container is shiftably attached to said first top section for shifting movement between a closed position in which said first container is directly below said first top section such that said check-in station is operable to check in inventory items on said first top section and an open position in which said first container is at least in part spaced from directly below said first top section such that an interior of said first container is accessible,
wherein said first top section is comprised of a material that does not interfere with electromagnetic signals, and wherein said first container is comprised of a material that blocks electromagnetic signals,
wherein said first reader antenna is positioned within said first container, and wherein said first container includes an open top portion positioned adjacent to a bottom surface of said first top section when said first container is in the closed position, such that said check-in station is configured to permit electromagnetic signals generated by said first reader antenna to exit from said first container upward through said first top section to generate a first scanning zone located above said first working surface section when said first container is in the closed position, such that upon inventory items passing through said first scanning zone information from the RFID tags of the inventory items being checked in is obtained and provided to the inventory database; and
a check-out station configured to check out inventory items out of the facility, wherein said check-out station comprises—
a second reader antenna configured to receive information from RFID tags of inventory items being checked out,
a second indicator configured to provide an indication of the inventory items being checked out,
wherein said check-out station comprises a second top section and a second container, with said second top section presenting a second working surface and a second container,
wherein said second container is shiftably attached to said second top section for shifting movement between a closed position in which said second container is directly below said second top section such that said check-out station is operable to check out items on said second top section and an open position in which said second container is at least in part spaced from directly below said second top section such that an interior of said second container is accessible,
wherein said second top section is comprised of a material that does not interfere with electromagnetic signals, and wherein said second container is comprised of a material that blocks electromagnetic signals,
wherein said second reader antenna is positioned within said second container, and wherein said second container includes an open top portion positioned adjacent to a bottom surface of said second top section when said second container is in the closed position, such that said check-out station is configured to permit electromagnetic signals generated by said second reader antenna to exit from said second container upward through said second top section to generate a second scanning zone located above said second working surface when said second container is in the closed position, such that upon inventory items passing through said second scanning zone information from the RFID tags of the inventory items being checked out is obtained and provided to the inventory database,
wherein the information related to the inventory items stored in the database includes a total number of inventory items in stock within the facility, wherein upon a total number of a particular type of inventory item in stock within the facility falling below a minimum threshold, said computing device is configured to automatically generate a reorder for additional inventory items of the particular type.

15. The system of claim 14, wherein at least one of said check-in station and said check-out station includes an RFID reader for processing information from the RFID tags of the inventory items received by a respective one of said reader antennas and for providing such processed information to the inventory database of said computing device.

16. The system of claim 14, wherein each of said check-in station and said check-out station comprises a table, wherein each of said first top section and said second top section comprises a table top, wherein each table further comprises one or more supporting elements for supporting said table top above the ground, and wherein said tables each includes a respective one of said first indicator or said second indicator, with said first indicator and said second indicator comprising light-emitting diodes.

\* \* \* \* \*